United States Patent
Takahashi et al.

(10) Patent No.: US 12,202,525 B2
(45) Date of Patent: Jan. 21, 2025

(54) MOVEMENT CONTROL SYSTEM, MOVEMENT CONTROL METHOD, NON-TRANSITORY COMPUTER-READABLE STORAGE MEDIUM STORING CONTROL PROGRAM, AND CONTROL DEVICE

(71) Applicant: HONDA MOTOR CO., LTD., Tokyo (JP)

(72) Inventors: Teruki Takahashi, Tokyo (JP); Ryoma Taguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 348 days.

(21) Appl. No.: 17/678,464

(22) Filed: Feb. 23, 2022

(65) Prior Publication Data

US 2022/0289236 A1 Sep. 15, 2022

(30) Foreign Application Priority Data

Mar. 12, 2021 (JP) ................. 2021-040631

(51) Int. Cl.
*B60W 60/00* (2020.01)
*G08C 17/02* (2006.01)

(52) U.S. Cl.
CPC ....... *B60W 60/005* (2020.02); *B60W 2556/45* (2020.02); *G08C 17/02* (2013.01)

(58) Field of Classification Search
None
See application file for complete search history.

(56) References Cited

U.S. PATENT DOCUMENTS

| 2018/0065643 | A1* | 3/2018 | Nishimine | ......... B60W 50/082 |
| 2019/0246444 | A1* | 8/2019 | Kanzaki | ............... H04W 76/18 |
| 2020/0273335 | A1 | 8/2020 | Murakami et al. | |
| 2020/0307600 | A1* | 10/2020 | Sato | ....................... G08G 1/167 |
| 2021/0206388 | A1* | 7/2021 | Smith | .................. G05D 1/0214 |

FOREIGN PATENT DOCUMENTS

JP 2020-140391 A 9/2020

* cited by examiner

*Primary Examiner* — Amelia Vorce
*Assistant Examiner* — Kyle S Park
(74) *Attorney, Agent, or Firm* — Paratus Law Group, PLLC

(57) ABSTRACT

A movement control system includes: a moving object; a first control device capable of communicating with the moving object; and a second control device configured to relay the communication between the moving object and the first control device. When communication between the first control device and the second control device is not restricted, the first control device performs first automatic movement control on the moving object via the second control device, and when the communication between the first control device and the second control device is restricted, the second control device performs second automatic movement control on the moving object. The first automatic movement control has fewer tasks assigned to a user of the moving object than the second automatic movement control.

10 Claims, 5 Drawing Sheets

MOVEMENT CONTROL SYSTEM, MOVEMENT CONTROL METHOD, NON-TRANSITORY COMPUTER-READABLE STORAGE MEDIUM STORING CONTROL PROGRAM, AND CONTROL DEVICE

CROSS REFERENCE TO RELATED APPLICATIONS

This application claims priority to Japanese Patent Application No. 2021-040631 filed on Mar. 12, 2021, the content of which is incorporated herein by reference.

TECHNICAL FIELD

The present invention relates to a movement control system, a movement control method, a non-transitory computer-readable storage medium storing a control program, and a control device.

BACKGROUND ART

There has been known a vehicle communication system capable of automatic movement control in which outside world information detected by a moving object such as a vehicle is transmitted to a server and a control instruction is transmitted from the server to the moving object.

When the vehicle performs the automatic movement control by communicating with the server via a relay station such as a base station, when the communication between the server and the relay station is restricted due to a failure or congestion, the automatic movement control on the vehicle based on instruction information from the server cannot be continued.

JP 2020-140391 A discloses a processing device that inquires of other vehicles whether to enable intervention control in emergency where an emergency situation occurs and communication with a center server is disrupted, and decides a center vehicle giving an instruction related to the intervention control from among the other vehicles replying to enable the intervention control and a host vehicle.

However, in JP 2020-140391 A, when there is no other vehicles that enable the intervention control, the automatic movement control based on the instruction information from the server cannot be continued. Therefore, there is room for further improvement in the technique in which the vehicle continues the automatic movement control based on the instruction information from the server.

An object of the present invention is to provide a movement control system, a movement control method, a non-transitory computer-readable storage medium storing a control program, and a control device capable of improving continuity of automatic movement control on a moving object from an outside.

SUMMARY OF INVENTION

An aspect of the present invention provides a movement control system that includes: a moving object; a first control device capable of communicating with the moving object; and a second control device configured to relay the communication between the moving object and the first control device. When communication between the first control device and the second control device is not restricted, the first control device performs first automatic movement control on the moving object via the second control device, and when the communication between the first control device and the second control device is restricted, the second control device performs second automatic movement control on the moving object. The first automatic movement control has fewer tasks assigned to a user of the moving object than the second automatic movement control.

Another aspect of the present invention provides a movement control method in a movement control system including a moving object, a first control device capable of communicating with the moving object, and a second control device configured to relay communication between the moving object and the first control device. The movement control method includes: when communication between the first control device and the second control device is not restricted, performing, by the first control device, first automatic movement control on the moving object via the second control device; and when the communication between the first control device and the second control device is restricted, performing, by the second control device, second automatic movement control on the moving object. The first automatic movement control has fewer tasks assigned to a user of the moving object than the second automatic movement control.

Another aspect of the present invention provides a non-transitory computer-readable storage medium storing a control program for a second control device configured to relay communication between a moving object and a first control device capable of communicating with the moving object in a movement control system including the moving object and the first control device. The control program causing a computer of the second control device to execute processing includes: relaying, when communication between the first control device and the second control device is not restricted, first automatic movement control on the moving object performed by the first control device; and performing, when the communication between the first control device and the second control device is restricted, second automatic movement control on the moving object. The first automatic movement control has fewer tasks assigned to a user of the moving object than the second automatic movement control.

Another aspect of the present invention provides a control device configured to relay communication between a moving object and a first control device capable of communicating with the moving object in a movement control system including the moving object and the first control device. The control device includes: a communication unit capable of communicating with the moving object and the first control device; and a control unit configured to relay, when communication between the first control device and the communication unit is not restricted, first automatic movement control on the moving object performed by the first control device, and perform, when the communication between the first control device and the communication unit is restricted, second automatic movement control on the moving object. The first automatic movement control has fewer tasks assigned to a user of the moving object than the second automatic movement control.

DESCRIPTION OF EMBODIMENTS

Hereinafter, an embodiment of a movement control system, a movement control method, a control program, and a control device according to the present invention will be described with reference to the drawings. In the following description of the embodiment, an example in which a vehicle M such as an automobile is used as a moving object in the movement control system according to the present invention will be described.

Figure 1:
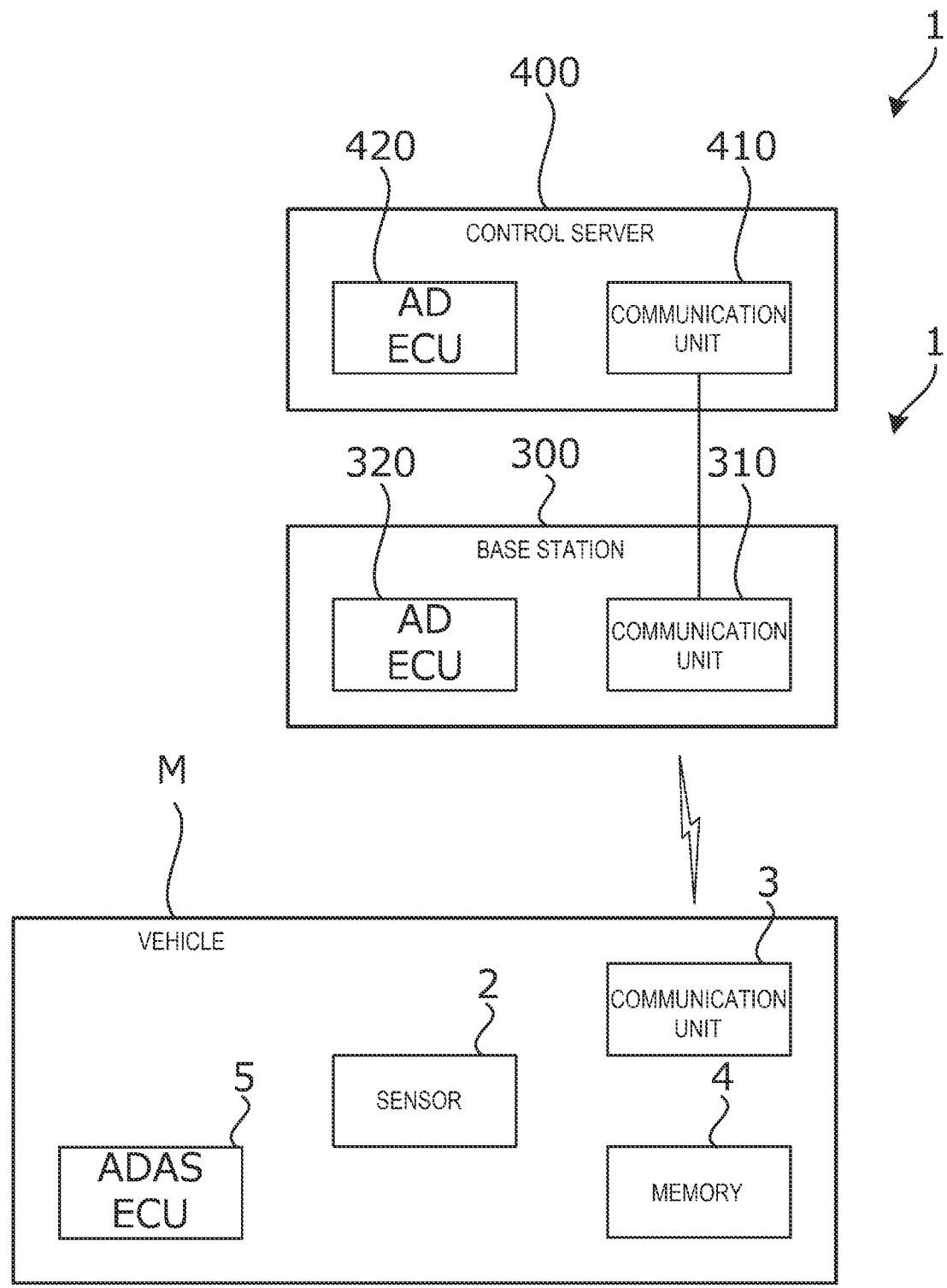
FIG. 1 is a diagram showing an example of a movement control system according to the present embodiment.

A movement control system 1 according to the present embodiment will be described with reference to FIG. 1. As shown in FIG. 1, the movement control system 1 includes the vehicle M, and a base station 300 and a control server 400 that are communicably connected to the vehicle M.

The vehicle M is a vehicle capable of performing automatic movement based on automatic movement control. The vehicle M includes a sensor 2 capable of acquiring outside world information around the vehicle M, and a communication unit 3 that communicates with the base station 300. The vehicle M further includes a memory 4 for storing vehicle information (including the outside world information acquired by the sensor 2) about the vehicle M, and an advanced driver assistance systems electronic control unit (ADAS ECU) 5 that manages operations of the vehicle M. The ADAS ECU 5 derives a control content of the automatic movement control on the vehicle M based on, for example, the outside world information acquired by the sensor 2.

The base station 300 includes a communication unit 310 and an automated driving electronic control unit (AD ECU) 320. A plurality of base stations 300 are installed at predetermined intervals in order to widely cover an area where the communication with the vehicle M is possible. The communication unit 310 is wirelessly connected to the vehicle M so as to be able to communicate with the vehicle M. In addition, the communication unit 310 is connected to the vehicle M and the control server 400 so as to be able to relay the communication between the vehicle M and the control server 400. The AD ECU 320 receives, for example, the outside world information about the vehicle M and the like from the vehicle M through the communication with the vehicle M, and derives a control content of the automatic movement control on the vehicle M based on the received outside world information about the vehicle M. Further, the AD ECU 320 transmits the derived control content of the automatic movement control on the vehicle M to the vehicle M.

The control server 400 includes a communication unit 410 and an AD ECU 420. The control server 400 is installed, for example, in a facility such as a management center. The communication unit 410 is communicably connected to the base station 300 via a wired or wireless communication network. In addition, the communication unit 410 is communicably connected to the vehicle M via the base station 300. The AD ECU 420 receives, for example, the outside world information about the vehicle M from the vehicle M through the communication with the vehicle M. and derives a control content of the automatic movement control on the vehicle M based on the received outside world information about the vehicle M. Further, the AD ECU 420 transmits the derived control content of the automatic movement control on the vehicle M to the vehicle M via the base station 300.

A method of wireless communication performed between the vehicle M and the base station 300 is, for example, a communication method used in a mobile phone, a smartphone, or the like and enabling a relatively wide range of movement. Examples of the method of the wireless communication include a third-generation mobile communication standard (hereinafter referred to as "3G"), a fourth-generation mobile communication standard (hereinafter referred to as "4G"), a fifth-generation mobile communication standard (hereinafter referred to as "5G"), and a sixth-generation mobile communication standard (hereinafter referred to as "6G"). A communication standard enables high-speed communication as the generation increases, that is, as the number increases from "3G" to "6G". Various base stations 300 corresponding to radio waves of 3G to 6G are installed in each place where the vehicle M travels.

The vehicle M specifies the predetermined base station 300 (for example, a 3G base station, a 4G base station, a 5G base station, or a 6G base station) serving as a partner with which the communication unit 3 communicates based on an intensity (communication environment) of a radio wave that can be received. The predetermined base station 300, which is the communication partner, changes according to a position where the vehicle M is travelling. For example, the vehicle M constantly measures a radio wave intensity of the neighboring base station 300, and when the radio wave becomes equal to or less than a certain intensity, disconnects a line with the base station 300 serving as the communication partner up to that time, and switches the line to a line with the other base station 300 having a higher intensity.

The vehicle M can execute "first automatic movement control" for performing the automatic movement based on control of the control server 400, "second automatic movement control" for performing the automatic movement based on control of the base station 300, and "third automatic movement control" for performing the automatic movement based on control of the vehicle M itself.

In the first automatic movement control, the vehicle M performs the automatic movement of the vehicle M based on the control content of the automatic movement derived by the AD ECU 420 of the control server 400. The control server 400 derives the control content of the automatic movement based on the outside world information about the vehicle M transmitted from the vehicle M.

In the second automatic movement control, the vehicle M performs the automatic movement of the vehicle M based on the control content of the automatic movement derived by the AD ECU 320 of the base station 300. The base station 300 derives the control content of the automatic movement based on the outside world information about the vehicle M transmitted from the vehicle M.

In the third automatic movement control, the vehicle M performs the automatic movement of the vehicle M based on the control content of the automatic movement derived by the ADAS ECU 5 of the vehicle M itself. The vehicle M derives the control content of the automatic movement based on the outside world information about the vehicle M acquired by the sensor 2.

The vehicle M executes the control content of the first automatic movement control derived by the control server 400, the control content of the second automatic movement control derived by the base station 300, and the control content of the third automatic movement control derived by the vehicle M by, for example, the ADAS ECU 5.

The first automatic movement control performed under the control of the control server 400 is a driving method having a higher degree of automation for the control of the vehicle than that of the second automatic movement control performed under the control of the base station 300. The second automatic movement control performed under the control of the base station 300 is a driving method having a higher degree of automation for the control of the vehicle than that of the third automatic movement control performed under the control of the vehicle M itself. A high degree of automation means that an amount of processing performed by the control units (AD ECU, ADAS ECU, or the like) is large. In other words, the high degree of automation means that a degree to which the vehicle is controlled based on operations of a driver (user) on the vehicle M is low, that is, the number of tasks such as monitoring surroundings of the vehicle M required by the driver is small.

The automatic movement control may be classified into level 5 to level 0 according to a level of the degree of automation based on an SAEJ3016 defined by SAE International. For example, the first automatic movement control may be classified into the level 5 and the level 4. The second automatic movement control may be classified into the level 3. The third automatic movement control may be classified into the level 2, the level 1, and the level 0.

Specifically, the level 5 is a driving level (fully automated driving) at which the control server 400 performs the automatic movement under all conditions. The level 4 is a driving level (advanced automated driving) at which the control server 400 performs all driving operations in a specific situation, and the vehicle M may not be driven by the driver even when the control server 400 cannot continue the driving operations. Therefore, at the level 4 and the level 5, the control server 400 responds even in an emergency.

The level 3 is a driving level (conditional automated driving) at which the base station 300 performs all of acceleration, steering, and braking, and the driver responds only when requested by the base station 300. At the level 3, the base station 300 monitors the surroundings, and the driver of the vehicle M has no responsibility to monitor the surroundings.

The level 2 is a driving level (partial driving automation) at which the vehicle M performs a plurality of operations among the acceleration, the steering, and the braking at one time. At the level 2, the driver of the vehicle M has responsibility to monitor the surroundings. The level 1 is a driving level (driving support) at which the vehicle M performs any one of operations of the acceleration, the steering, and the braking. That is, at the level 1, the vehicle M controls any one of the operations of an accelerator, a brake, and a handle according to a situation of the surroundings under a specific condition, and the driver of the vehicle M performs all the other driving operations. The level 0 is a driving level without automation, and at the level 0, the driver of the vehicle M performs all the driving operations.

The third automatic movement control may be a state in which the ADAS is operating. The ADAS is an advanced driving support system represented by an adaptive cruise control system (ACC) or a lane keeping assist system (LKAS). Conditions under which the first automatic movement control to the third automatic movement control are performed are examples, and may be freely set as long as the degree of automation of the vehicle M is high, that is, the number of tasks of the driver is small in an order of the first automatic movement control, the second automatic movement control, and the third automatic movement control. For example, a part or all of the first automatic movement control to the third automatic movement control may be in an automated driving state, or instead of in the automated driving state, a part or all of the first automatic movement control to the third automatic movement control may be in a state in which the driving support is executed.

Figure 2:
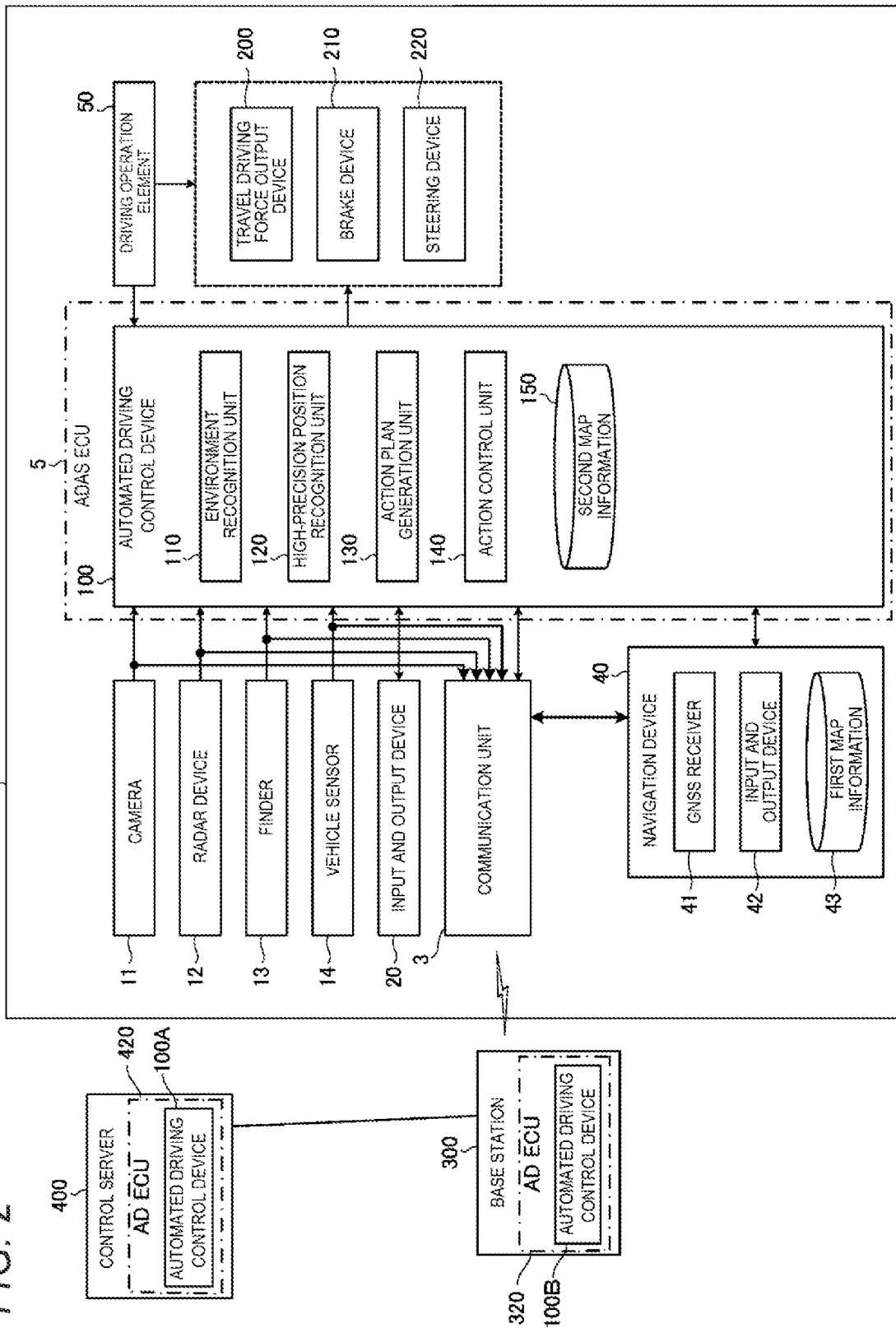
FIG. 2 is a block diagram showing a vehicle system mounted on a vehicle (moving object) of the movement control system.

Next, a vehicle system 10 mounted on the vehicle M will be described with reference to FIG. 2. As shown in FIG. 2, the vehicle system 10 includes a camera 11, a radar device 12, a finder 13, a vehicle sensor 14, an input and output device 20, a communication unit 3, a navigation device 40, a driving operation element 50, an automated driving control device 100, a travel driving force output device 200, a brake device 210, and a steering device 220. These devices are communicably connected to each other via a wired or wireless communication network. The communication network that connects these devices is, for example, a controller area network (CAN).

The camera 11, the radar device 12, the finder 13, and the vehicle sensor 14 are included in the sensor 2 shown in FIG. 1. The camera 11, the radar device 12, the finder 13, and the vehicle sensor 14 acquire the outside world information around the vehicle M.

The camera 11 is a digital camera that captures an image of the surroundings of the vehicle M (for example, a region in front of the vehicle M), and outputs image data obtained by the image-capturing to the automated driving control device 100 and the communication unit 3. The radar device 12 is, for example, a radar device using radio waves in a millimeter wave band, detects a position of an object around (for example, in front of, behind, and on sides of the vehicle M) the vehicle M. and outputs a detection result to the automated driving control device 100 and the communication unit 3. The finder 13 is, for example, a laser imaging detection and ranging (LIDAR), measures a distance to the object (a target) around (for example, in front of, behind, and on the sides of the vehicle M) the vehicle M using a predetermined laser light, and outputs a measurement result to the automated driving control device 100 and the communication unit 3.

The vehicle sensor 14 includes, for example, a vehicle speed sensor that detects a speed of the vehicle M, an acceleration sensor that detects an acceleration of the vehicle M, an angular velocity sensor that detects an angular velocity around a vertical axis of the vehicle M, an orientation sensor that detects an orientation of the vehicle M. and the like. The vehicle sensor 14 further includes a radio wave intensity sensor that detects the intensity of the radio wave (that is, the communication environment) used by the communication unit 3 for the communication. The vehicle sensor 14 outputs a detection result of each of the sensors to the automated driving control device 100 and the communication unit 3.

The input and output device 20 includes an output device that outputs various types of information to the user of the vehicle M (hereinafter, also simply referred to as the user), and an input device that receives various input operations from the user. In the present embodiment, the user is not limited to a person who manages or owns and uses the vehicle M. For example, the user may be a person who receives a request from the person who manages or owns the vehicle M. and uses the vehicle M as a substitute for the request.

The output device of the input and output device 20 is, for example, a display that performs display based on processing results of the automated driving control device 100, an automated driving control device 100A (to be described later) of the control server 400, and an automated driving control device 100B (to be described later) of the base station 300. The output device may be a speaker, a buzzer, a display lamp, or the like. The input device of the input and output device 20 is, for example, a touch panel or an operation button (a key, a switch, or the like) that outputs an operation signal corresponding to an input operation received from the user to the automated driving control device 100, the automated driving control device 100A of the control server 400, and the automated driving control device 100B of the base station 300.

The navigation device 40 includes a global navigation satellite system (GNSS) receiver 41 and an input and output device 42. The navigation device 40 further includes a storage device (not shown) such as a hard disk drive (hereinafter, also referred to as an HDD) or a flash memory, and first map information 43 is stored in the storage device. The first map information 43 is, for example, information indicating a road shape by a link indicating a road and nodes connected by the link. Further, the first map information 43 may include information indicating a curvature of the road or a point of interest (POI).

The GNSS receiver 41 specifies, based on a signal received from a GNSS satellite, a latitude and a longitude of a point at which the vehicle M is located as a position of the vehicle M. Further, the navigation device 40 may specify or correct the position of the vehicle M by an inertial navigation system (INS) using an output of the vehicle sensor 14.

The input and output device 42 includes an output device that outputs various types of information to the user and an input device that receives various input operations from the user. The output device of the input and output device 42 is, for example, a display that performs display (for example, displays a route-on-map to be described later) based on a processing result of the navigation device 40. The input device of the input and output device 42 is, for example, a touch panel or an operation button (a key, a switch, or the like) that outputs an operation signal corresponding to an input operation received from the user to the navigation device 40. The input and output device 42 and the input and output device 20 may be commonly used.

While a detailed description is omitted, the navigation device 40 determines, for example, a route (hereinafter, also referred to as the route-on-map) from the position of the vehicle M specified by the GNSS receiver 41 to a destination input by the user with reference to the first map information 43. The navigation device 40 guides the user along the determined route-on-map using the input and output device 42. The navigation device 40 can output information indicating the specified position of the vehicle M and the determined route-on-map to the automated driving control device 100 and the communication unit 3.

The driving operation element 50 includes various elements such as an accelerator pedal, a brake pedal, a shift lever, a steering wheel, an irregular steering, and a joystick. The driving operation element 50 is provided with a sensor that detects an operation amount to the driving operation element 50 or whether there is an operation on the driving operation element 50. A detection result by the sensor of the driving operation element 50 is output to a part or all of the automated driving control device 100, the communication unit 3, the travel driving force output device 200, the brake device 210, and the steering device 220.

The travel driving force output device 200 outputs a travel driving force (torque) for the vehicle M to travel to driving wheels. The travel driving force output device 200 includes, for example, an electric motor and an electric motor electric control unit (ECU) that controls the electric motor. The electric motor electric control unit controls the electric motor based on the detection result by the sensor of the driving operation element 50 (for example, the accelerator pedal) and control information from the automated driving control device 100, the automated driving control device 100A of the control server 400, and the automated driving control device 100B of the base station 300. Further, when the vehicle M includes an internal combustion engine or a transmission as a drive source, the travel driving force output device 200 may include the internal combustion engine or the transmission and an ECU that controls the internal combustion engine or the transmission.

The brake device 210 includes, for example, a brake caliper, a cylinder for transferring hydraulic pressure to the brake caliper, an electric motor that generates the hydraulic pressure in the cylinder, and a brake ECU. The brake ECU controls the electric motor of the brake device 210 based on the detection result by the sensor of the driving operation element 50 (for example, the brake pedal) and the control information from the automated driving control device 100, the automated driving control device 100A of the control server 400, and the automated driving control device 100B of the base station 300 such that a brake torque according to a braking operation is output to each wheel.

The steering device 220 includes, for example, a steering ECU and an electric motor. The electric motor of the steering device 220 changes a direction of the steered wheels by applying a force to, for example, a rack-and-pinion mechanism. The steering ECU drives the electric motor of the steering device 220 to change the direction (that is, a steering angle) of the steered wheels based on the detection result by the sensor of the driving operation element 50 (for example, the steering wheel) and the control information from the automated driving control device 100, the automated driving control device 100A of the control server 400, and the automated driving control device 100B of the base station 300.

The communication unit 3 can wirelessly communicate with the communication unit 310 of the base station 300. The communication unit 3 can communicate with the communication unit 410 of the control server 400 via the base station 300. The communication unit 3 transmits the vehicle information including the outside world information around the vehicle M acquired by the camera 11, the radar device 12, the finder 13, and the vehicle sensor 14, position information and route information determined by the navigation device 40, operation information detected by the driving operation element 50, and the like to the base station 300 or to the control server 400 via the base station 300. The communication unit 3 may be constituted by, for example, a telematics control unit (TCU) capable of bidirectional communication. In addition, the communication unit 3 may use, for example, a cellular network, a Wi-Fi (registered trademark) network, Bluetooth (registered trademark), dedicated short range communication (DSRC), or the like.

The automated driving control device 100 includes an environment recognition unit 110, a high-precision position recognition unit 120, an action plan generation unit 130, and an action control unit 140. The automated driving control device 100 further includes a storage device (not shown) implemented by a flash memory that can be accessed by each of the functional units (for example, the high-precision position recognition unit 120) of the automated driving control device 100, and second map information 150 is stored in the storage device. The storage device may be the memory 4 shown in FIG. 1.

The environment recognition unit 110 performs sensor fusion processing on the information acquired by a part or all of the camera 11, the radar device 12, and the finder 13 to recognize the object around the vehicle M and recognize the position of the object. The environment recognition unit 110 recognizes, for example, an obstacle, a road shape, a traffic light, a guardrail, a utility pole, a surrounding vehicle (including a travelling state such as a speed or an acceleration, and a parking state), a lane mark, a pedestrian, and the like, and recognizes positions thereof.

The high-precision position recognition unit 120 recognizes the detailed position and a posture of the vehicle M with reference to the position of the vehicle M specified by the navigation device 40, the detection result by the vehicle sensor 14, the image captured by the camera 11, the second map information 150, and the like. For example, the high-precision position recognition unit 120 recognizes a travelling lane along which the vehicle M is travelling, or recognizes a relative position and a posture of a host vehicle with respect to the travelling lane.

The action plan generation unit 130 generates an action plan of the vehicle M. Specifically, the action plan generation unit 130 generates a target trajectory along which the vehicle M is about to travel as the action plan of the vehicle M. The target trajectory is, for example, information expressed by arranging points (trajectory points) to be arrived by the vehicle M for each predetermined travel distance (for example, about several [meters]). Further, the target trajectory may include information about a speed element such as a target speed or a target acceleration of the vehicle M for each predetermined time or for each trajectory point.

The action control unit 140 performs control such that the vehicle M acts in accordance with the action plan generated by the action plan generation unit 130. Specifically, the action control unit 140 controls the travel driving force output device 200, the brake device 210, and the steering device 220 such that the vehicle M travels along the target trajectory generated by the action plan generation unit 130 at a scheduled time. For example, the action control unit 140 controls the travel driving force output device 200 or the brake device 210 based on a speed element associated with the target trajectory, and controls the steering device 220 in accordance with a degree of curvature of the target trajectory.

The second map information 150 is map information with higher accuracy than that of the first map information 43. The second map information 150 includes, for example, information indicating a center of the lane, information indicating a boundary line (for example, a road partition line) of the lane, and the like. The second map information 150 may further include road information, traffic regulation information, address information, facility information, telephone number information, and the like. The second map information 150 may be updated at any time. The second map information 150 may be updated based on, for example, the information acquired by a part or all of the camera 11, the radar device 12, and the finder 13.

The automated driving control device 100 is provided in the ADAS ECU 5. Each function of the automated driving control device 100 is executed by the ADAS ECU 5. Each of the functional units of the automated driving control device 100 is implemented by, for example, a central processing unit (CPU) executing predetermined programs (software). A part or all of the functional units of the automated driving control device 100 may be implemented by hardware such as a large scale integration (LSI), an application specific integrated circuit (ASIC), a field-programmable gate array (FPGA), and a graphics processing unit (GPU). For example, the storage device that stores the second map information 150 and the high-precision position recognition unit 120 may be implemented by a map positioning unit (MPU). Further, a part or all of the functional units included in the automated driving control device 100 may be implemented by cooperation of software and hardware.

Next, the AD ECU 420 of the control server 400 will be described with reference to FIG. 2. As shown in FIG. 2, the AD ECU 420 includes the automated driving control device 100A. The automated driving control device 100A has the same configuration and functions as those of the automated driving control device 100 provided in the vehicle system 10 of the vehicle M. Each function of the automated driving control device 100A is executed by the AD ECU 420. The AD ECU 420 derives the control content of the first automatic movement control performed by the vehicle M based on the vehicle information (including the outside world information) about the vehicle M transmitted from the vehicle M, and transmits the derived control content to the vehicle M via the base station 300. The AD ECU 420 performs the first automatic movement control on the vehicle M by the communication via the base station 300. The AD ECU 420 is a higher-level ECU having more calculation resources and more available information than those of the ADAS ECU 5 of the vehicle M and the AD ECU 320 of the base station 300.

Next, the AD ECU 320 of the base station 300 will be described with reference to FIG. 2. As shown in FIG. 2, the AD ECU 320 includes the automated driving control device 100B. The automated driving control device 100B has the same configuration and functions as those of the automated driving control device 100 provided in the vehicle system 10 of the vehicle M. Each function of the automated driving control device 100B is executed by the AD ECU 320. The AD ECU 320 derives the control content of the second automatic movement control performed by the vehicle M based on the vehicle information (including the outside world information) about the vehicle M transmitted from the vehicle M, and transmits the derived control content to the vehicle M. The AD ECU 320 performs the second automatic movement control on the vehicle M by the communication. The AD ECU 320 is a higher-level ECU having more calculation resources and more available information than those of the ADAS ECU 5 of the vehicle M.

The AD ECU 420 of the control server 400 and the AD ECU 320 of the base station 300 are implemented, for example, by the CPU executing the predetermined programs (software). In addition, a part or all of these components may be implemented by hardware such as an LSI, an ASIC, an FPGA, or a GPU, or may be implemented by cooperation of software and hardware. The programs may be stored in advance in the storage device such as the HDD or the flash memory.

Figure 3:
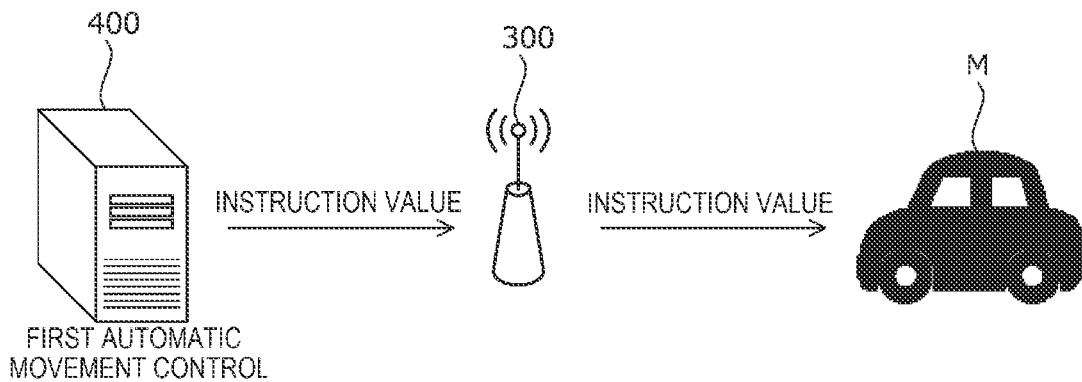
FIG. 3 is a diagram schematically showing an example in which a control server performs automatic movement control on the vehicle.

Next, an example of performing the automatic movement control on the vehicle M will be described with reference to FIGS. 3 to 5. FIG. 3 is a diagram showing an example in which the control server 400 performs the automatic movement control on the vehicle M. As shown in FIG. 3, the control server 400 of the present example is connected to the base station 300 in a state in which the control server 400 can normally communicate with the base station 300. That is, the communication between the control server 400 and the base station 300 is not restricted.

Here, for example, the state of "restriction on the communication" is a state in which a delay occurs in the communication compared to a normal state or a state in which the communication is disconnected due to factors such as deterioration of a radio wave condition or the like. In addition, the factors of the "restriction on the communication" may include a failure or congestion of the control server 400 itself. Whether the communication is restricted is determined by whether there is a response by transmission and reception of a communication confirmation signal, whether a communication delay time or the number of times the communication delay occurs exceeds a predetermined value, or the like.

In a case of the example shown in FIG. 3, the base station 300 is connected to the vehicle M so as to be able to normally communicate with the vehicle M. That is, the communication between the base station 300 and the vehicle M is not restricted.

In this way, when the communication between the control server 400 and the base station 300 is not restricted and the communication between the base station 300 and the vehicle M is not restricted, the control server 400 performs the first automatic movement control on the vehicle M via the base station 300.

Figure 4:
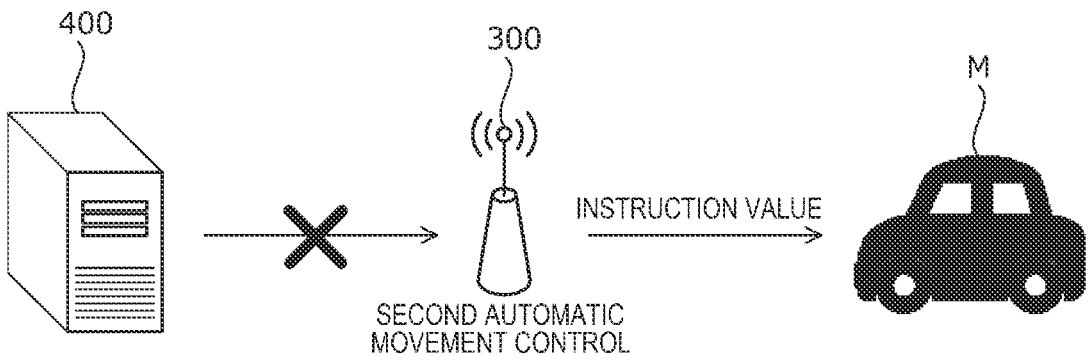
FIG. 4 is a diagram schematically showing an example in which a base station performs the automatic movement control on the vehicle.

FIG. 4 is a diagram showing an example in which the base station 300 performs the automatic movement control on the vehicle M. As shown in FIG. 4, the control server 400 of the present example is connected to the base station 300 in a state in which the control server 400 cannot normally communicate with the base station 300. That is, the communication between the control server 400 and the base station 300 is restricted.

Meanwhile, the base station 300 is connected to the vehicle M in a state in which the base station 300 can normally communicate with the vehicle M. That is, the communication between the base station 300 and the vehicle M is not restricted. The determination as to whether the "restriction on the communication" occurs is performed in the same manner as in the example described above with reference to FIG. 3.

In this way, when the communication between the control server 400 and the base station 300 is restricted and the communication between the base station 300 and the vehicle M is not restricted, the base station 300 performs the second automatic movement control on the vehicle M.

Figure 5:
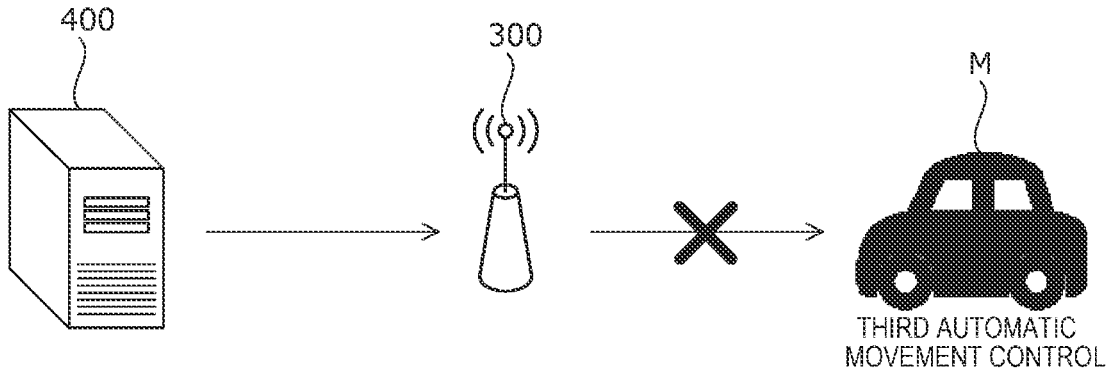
FIG. 5 is a diagram schematically showing an example in which the vehicle autonomously performs the automatic movement control.

FIG. 5 is a diagram showing an example in which the vehicle M itself performs the automatic movement control on the vehicle M. As shown in FIG. 5, the control server 400 of the present example is connected to the base station 300 in a state in which the control server 400 can normally communicate with the base station 300. That is, the communication between the control server 400 and the base station 300 is not restricted.

Meanwhile, the base station 300 is connected to the vehicle M in the state in which the base station 300 cannot normally communicate with the vehicle M. That is, the communication between the base station 300 and the vehicle M is restricted. The determination as to whether the "restriction on the communication" occurs is performed in the same manner as in the example described above with reference to FIG. 3.

In this way, when the communication between the control server 400 and the base station 300 is not restricted and the communication between the base station 300 and the vehicle M is restricted, the vehicle M autonomously performs the third automatic movement control on the vehicle M.

The example shown in FIG. 5 shows a case in which the communication between the control server 400 and the base station 300 is not restricted, whereas the present invention is not limited thereto, and the communication between the control server 400 and the base station 300 may be restricted. That is, when the communication between the base station 300 and the vehicle M is restricted, the vehicle M autonomously performs the third automatic movement control on the vehicle M regardless of whether the communication between the control server 400 and the base station 300 is restricted.

Figure 6:
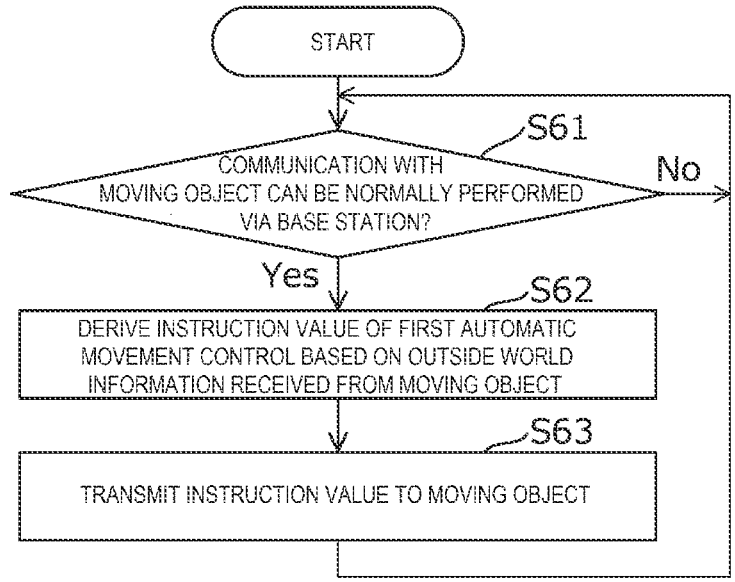
FIG. 6 is a flowchart of an example of movement control executed by the control server.
Figure 7:
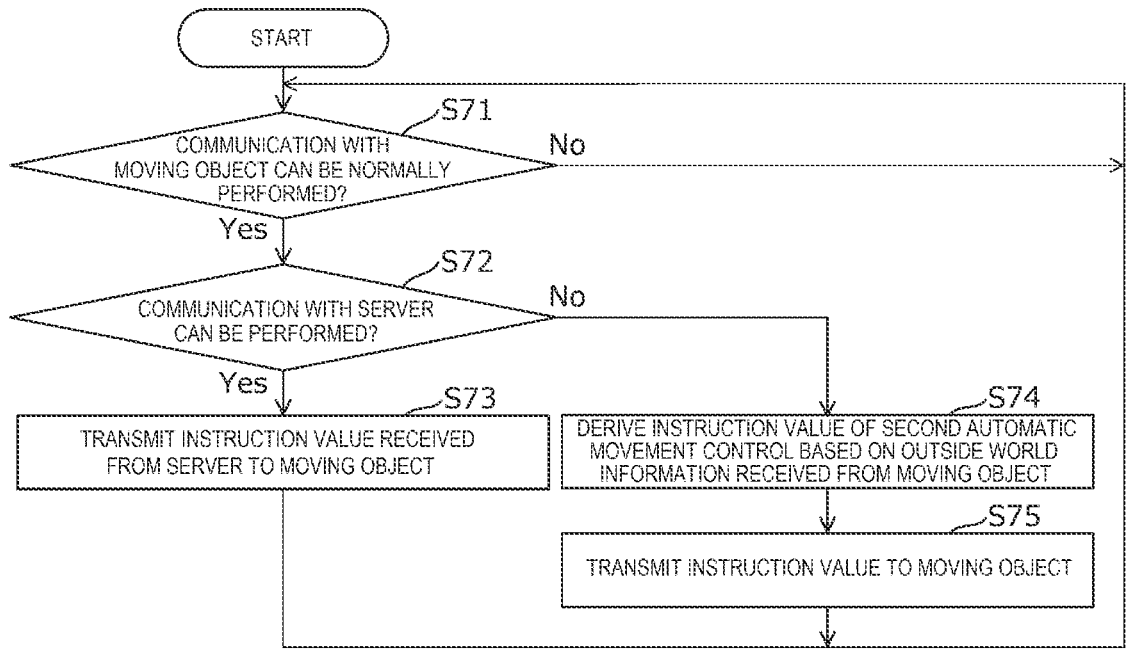
FIG. 7 is a flowchart of an example of movement control executed by the base station.
Figure 8:
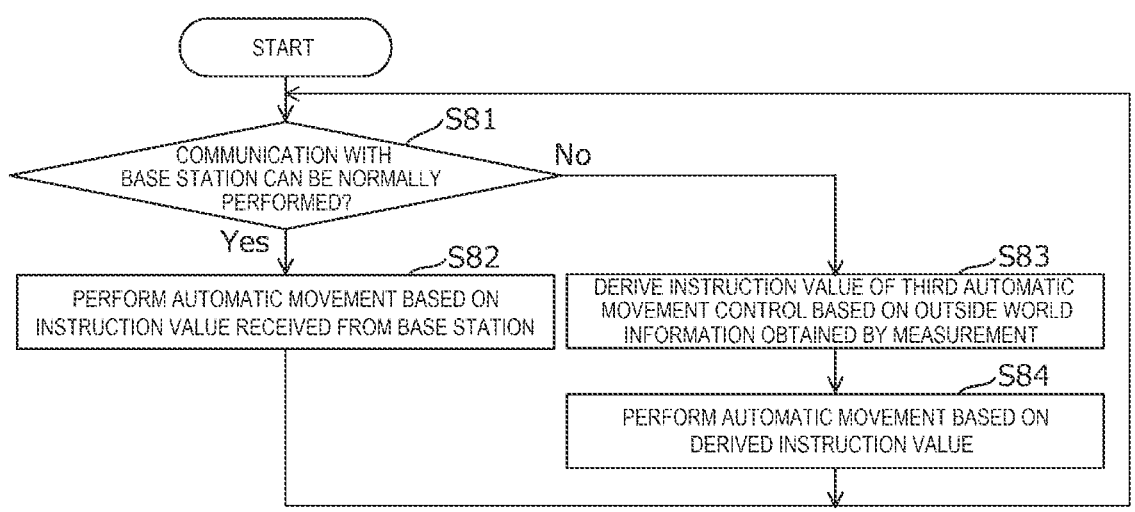
FIG. 8 is a flowchart of an example of movement control executed by the vehicle.

Next, movement control on the vehicle M in the movement control system 1 will be described with reference to FIGS. 6 to 8.

First, the movement control on the vehicle M performed by the control server 400 will be described with reference to FIG. 6.

When an ignition switch of the vehicle M is pressed and an engine thereof is started, a start signal for notifying that the engine is started is transmitted from the vehicle M to the base station 300 and the control server 400.

When the control server 400 receives the start signal from the vehicle M, the control server 400 determines whether the communication between the control server 400 and the vehicle M can be normally performed via the base station 300 (step S61). For example, the control server 400 transmits the communication confirmation signal to the vehicle M via the base station 300, and determines whether the communicate with the vehicle M can be normally performed via the base station 300 based on a reception result of a response signal from the vehicle M in response to the transmitted communication confirmation signal.

When the control server 400 determines in step S61 that the communication with the vehicle M cannot be normally performed (No in step S61), the control server 400 repeats determination processing of step S61.

On the other hand, when the control server 400 determines in step S61 that the communication with the vehicle M can be normally performed (Yes in step S61), the control server 400 derives the control content of the first automatic movement control (for example, an instruction value for the vehicle M) based on the outside world information about the vehicle M received from the vehicle M via the base station 300 (step S62). The instruction value for the vehicle M derived based on the outside world information includes a "speed instruction value" indicating the moving speed of the vehicle M, an "acceleration instruction value" indicating an acceleration amount of the vehicle M, and the like.

Next, the control server 400 transmits the instruction value for the vehicle M derived in step S62 to the vehicle M via the base station 300 (step S63). After transmitting the instruction value to the vehicle M, the control server 400 returns to step S61 and repeats a series of processing. The vehicle M performs the automatic movement under the first automatic movement control based on the instruction value (control content) transmitted from the control server 400.

Next, the movement control on the vehicle M performed by the base station 300 will be described with reference to FIG. 7. When the ignition switch of the vehicle M is pressed and the engine thereof is started, the start signal for notifying that the engine is started is transmitted from the vehicle M to the base station 300 and the control server 400.

When the base station 300 receives the start signal from the vehicle M, the base station 300 determines whether the communication between the base station 300 and the vehicle M can be normally performed (step S71). For example, the base station 300 transmits the communication confirmation signal to the vehicle M, and determines whether the communication with the vehicle M can be normally performed based on the reception result of the response signal from the vehicle M in response to the transmitted communication confirmation signal.

When the base station 300 determines in step S71 that the communication with the vehicle M cannot be normally performed (No in step S71), the base station 300 repeats determination processing of step S71.

On the other hand, when the base station 300 determines in step S71 that the communication with the vehicle M can be normally performed (Yes in step S71), the base station 300 determines whether the communication between the base station 300 and the control server 400 can be normally performed (step S72). For example, the base station 300 transmits the communication confirmation signal to the control server 400, and determines whether the communication with the control server 400 can be normally performed based on a reception result of a response signal from the control server 400 in response to the transmitted communication confirmation signal.

In step S72, when the base station 300 determines that the communication with the control server 400 can be normally performed (Yes in step S72), the base station 300 relays (passes through) the control content (for example, the instruction value for the vehicle M) of the first automatic movement control received from the control server 400 as it is and transmits the relayed control content to the vehicle M (step S73). In this case, since the communication between the base station 300 and the vehicle M is normal and the communication between the base station 300 and the control server 400 is also normal, the control content of the first automatic movement control derived by the control server 400 is transmitted to the vehicle M. After transmitting the instruction value to the vehicle M, the base station 300 returns to step S71 and repeats a series of processing. The vehicle M performs the automatic movement under the first automatic movement control based on the instruction value (control content) transmitted from the control server 400 and being relayed via the base station 300.

On the other hand, when the base station 30) determines in step S72 that the communication with the control server 400 cannot be normally performed (No in step S72), the base station 300 derives the control content (for example, the instruction value for the vehicle M) of the second automatic movement control based on the outside world information about the vehicle M received from the vehicle M (step S74). The instruction value for the vehicle M derived based on the outside world information includes, for example, the "speed instruction value" indicating the moving speed of the vehicle M, the "acceleration instruction value" indicating the acceleration amount of the vehicle M, and the like.

Next, the base station 300 transmits the instruction value for the vehicle M derived in step S74 to the vehicle M (step S75). After transmitting the instruction value to the vehicle M, the base station 300 returns to step S71 and repeats a series of processing. The vehicle M performs the automatic movement under the second automatic movement control based on the instruction value (control content) transmitted from the base station 300.

Next, the movement control on the vehicle M by the vehicle M itself will be described with reference to FIG. 8.

When the ignition switch of the vehicle M is pressed and the engine thereof is started, the vehicle M determines whether the communication between the vehicle M and the base station 300 can be normally performed (step S81). For example, the vehicle M transmits the communication confirmation signal to the base station 300, and determines whether the communication with the base station 300 can be normally performed based on a reception result of a response signal from the base station 300 in response to the transmitted communication confirmation signal.

When the vehicle M determines in step S81 that the communication with the base station 300 can be normally performed (Yes in step S81), the vehicle M performs the automatic movement under the automatic movement control based on the control content (for example, the instruction value for the vehicle M) of the automatic movement control received from the base station 300 (step S82). The vehicle M performs the automatic movement under the automatic movement control, and returns to step S81 to repeat a series of processing.

The automatic movement under the automatic movement control performed in step S82 is the automatic movement performed based on the control content of the first automatic movement control derived by the control server 400 or the automatic movement performed based on the control content of the second automatic movement control derived by the base station 300. The automatic movement under the first automatic movement control is performed when the communication between the control server 400 and the base station 300 and the communication between the base station 300 and the vehicle M are not restricted. The automatic movement under the second automatic movement control is performed when the communication between the control server 400 and the base station 300 is restricted and the communication between the base station 300 and the vehicle M is not restricted.

On the other hand, when the vehicle M determines in step S81 that the communication with the base station 300 cannot be normally performed (No in step S81), the vehicle M derives the control content (for example, the instruction value for the vehicle M) of the third automatic movement control based on the outside world information about the vehicle M acquired by measurement of the vehicle M itself (step S83). The instruction value for the vehicle M derived based on the outside world information includes, for example, the "speed instruction value" indicating the moving speed of the vehicle M, the "acceleration instruction value" indicating the acceleration amount of the vehicle M, and the like.

Next, the vehicle M performs the automatic movement under the third automatic movement control based on the control content (for example, the instruction value for the vehicle M) of the third automatic movement control derived in step S83 (step S84). The vehicle M performs the automatic movement under the third automatic movement control, and returns to step S81 to repeat a series of processing.

When the communication between the vehicle M and the base station 300 returns to a normal state (the restriction on the communication is eliminated) while the vehicle M is performing the automatic movement under the third automatic movement control, the vehicle M performs the automatic movement under the first automatic movement control by the control server 400 or the automatic movement under the second automatic movement control by the base station 300 depending on communication states between the base station 300 and the control server 400. In this case, when the communication between the base station 300 and the control server 400 is not restricted, the automatic movement control on the vehicle M is controlled so as to first shift from the third automatic movement control by the vehicle M to the second automatic movement control by the base station 300, and then shift from the second automatic movement control by the base station 300 to the first automatic movement control by the control server 400. Whether the restriction on the communication is eliminated is determined based on, for example, whether a state in which the communication is not restricted continues for a predetermined time or more, whether the communication is continuously performed a predetermined number of times or more without the restriction on the communication, and the like.

As described above, according to the movement control system 1, when the communication between the control server 400 and the base station 300 is not restricted, the control server 400 performs the first automatic movement control on the vehicle M via the base station 300, and when the communication between the control server 400 and the base station 300 is restricted, the base station 300 performs the second automatic movement control on the vehicle M. The first automatic movement control has fewer tasks assigned to the driver of the vehicle M than the second automatic movement control. Therefore, even when the communication between the control server 400 and the base station 300 is restricted and the control server 400 cannot perform the first automatic movement control on the vehicle M, the base station 300 can perform the second automatic movement control on the vehicle M instead of the control server 400. Accordingly, continuity of the automatic movement control from the outside on the vehicle M can be improved. Further, the control server 400 is a higher-level device having more calculation resources and more available information than those of the base station 30), and can execute the first automatic movement control in which the number of tasks of the driver is smaller than that of the second automatic movement control by the base station 300. Therefore, when the communication between the control server 400 and the base station 300 is not restricted, a load on the driver can be reduced by executing the first automatic movement control having fewer tasks assigned to the driver by the control server 400.

Further, according to the movement control system 1, when the communication between the base station 300 and the vehicle M is restricted, the vehicle M autonomously performs the third automatic movement control. Then, the second automatic movement control has fewer tasks assigned to the user than the third automatic movement control. Therefore, while the control server 400 executes the first automatic movement control on the vehicle M or while the base station 300 executes the second automatic movement control on the vehicle M, the vehicle M can autonomously perform the third automatic movement control even when the communication between the base station 300 and the vehicle M is restricted and the communication between the control server 400 and the vehicle M is restricted. Accordingly, the continuity of the automatic movement control on the vehicle M itself can be improved. Further, the base station 300 is a higher-level device having more calculation resources and more available information than those of the vehicle M, and can execute the second automatic movement control in which the number of tasks of the driver is smaller than that of the third automatic movement control by the vehicle M. Therefore, when the communication between the control server 400 and the base station 300 is restricted and the communication between the base station 300 and the vehicle M is not restricted, the load on the driver can be reduced by executing the second automatic movement control having fewer tasks assigned to the driver.

According to the movement control system 1, when the restriction on the communication between the base station 300 and the vehicle M is eliminated while the vehicle M executes the third automatic movement control, instead of directly switching from the third automatic movement control by the vehicle M to the first automatic movement control by the control server 400, the second automatic movement control by the base station 300 is first executed, and thereafter, the first automatic movement control by the control server 400 is executed when the communication between the control server 400 and the base station 300 is not restricted. In this way, by switching methods of the automatic movement control in a stepwise manner, a sudden change in the number of tasks of the driver can be prevented and a psychological burden on the driver can be reduced.

According to the movement control system 1, whether the restriction on the communication is eliminated is determined based on whether the state in which the communication is not restricted continues for the predetermined time or more, whether the communication is continuously performed a predetermined number of times or more without the restriction on the communication, and the like. Therefore, by not switching the methods of the automatic movement control even when the communication is temporarily not restricted, it is possible to prevent a situation in which the tasks of the driver are frequently switched when a variation in the communication environment is large, which can reduce the load on the driver.

Further, according to the movement control system 1, for example, when a delay amount of the communication exceeds a predetermined value, it is determined that the communication is restricted. Therefore, by switching a subject of the automatic movement control on the vehicle M according to the delay amount of the communication, frequent switching due to the delay of the communication can be prevented, and the continuity of the automatic movement control on the moving object can be improved.

Although the embodiment of the present invention has been described above, the present invention is not limited to the above embodiment, and modifications, improvements, and the like can be made as appropriate.

For example, the above-described embodiment describes an example in which the moving object is the vehicle, whereas the present invention is not limited thereto. The concept of the present invention can be applied not only to the vehicle but also to a robot, a ship, an aircraft, and the like that are provided with a drive source and movable by power of the drive source.

At least the following matters are described in the present specification. Although corresponding constituent elements or the like in the above embodiments are shown in parentheses, the present invention is not limited thereto.

(1) A movement control system includes:
 a moving object (vehicle M);
 a first control device (control server 400) capable of communicating with the moving object; and
 a second control device (base station 300) configured to relay the communication between the moving object and the first control device, in which
 when communication between the first control device and the second control device is not restricted, the first control device performs first automatic movement control on the moving object via the second control device,
 when the communication between the first control device and the second control device is restricted, the second control device performs second automatic movement control on the moving object, and the first automatic movement control has fewer tasks assigned to a user of the moving object than the second automatic movement control.

According to (1), even when the communication between the first control device and the second control device is restricted and the first control device cannot perform the first automatic movement control on the moving object, the second control device can perform the second automatic movement control on the moving object instead of the first control device, and thus the continuity of the automatic movement control on the moving object from the outside can be improved. Further, the first control device is a higher-level device having more calculation resources and more available information than those of the second control device, and can execute the first automatic movement control having fewer tasks assigned to the user than the second automatic movement control executed by the second control device. When the communication between the first control device and the second control device is not restricted, the load on the user can be reduced by executing the first automatic movement control having fewer tasks assigned to the user.

(2) The movement control system according to (1), in which when communication between the second control device and the moving object is restricted, the moving object autonomously performs third automatic movement control, and the second automatic movement control has fewer tasks assigned to the user than the third automatic movement control.

According to (2), even when the communication between the second control device and the moving object is restricted and the communication between the first control device and the moving object is restricted during execution of the first automatic movement control on the moving object by the first control device or during execution of the second automatic movement control on the moving object by the second control device, since the moving object can autonomously perform the third automatic movement control, the continuity of the automatic movement control on the moving object can be improved. Further, the second control device is a higher-level device having more calculation resources and more available information than those of the moving object, and can execute the second automatic movement control having fewer tasks assigned to the user than the third automatic movement control executed by the moving object. When the communication between the first control device and the second control device is restricted and the communication between the second control device and the moving object is not restricted, the load on the user can be reduced by executing the second automatic movement control having fewer tasks assigned to the user.

(3) The movement control system according to (2), in which the second control device performs the second automatic movement control when restriction on the communication between the second control device and the moving object is eliminated while the moving object is executing the third automatic movement control, and then, the first control device performs the first automatic movement control when the communication between the first control device and the second control device is not restricted.

According to (3), when the restriction on the communication between the second control device and the moving object is eliminated while the moving object is executing the third automatic movement control, instead of directly switching from the third automatic movement control by the moving object to the first automatic movement control by the first control device, the methods of the automatic movement control are switched in a stepwise manner with the second automatic movement control by the second control device interposed therebetween, and thereby a sudden change in the number of tasks of the user can be prevented and a psychological burden on the driver can be reduced.

(4) The movement control system according to (3), in which elimination of the restriction on the communication is established when at least one of a condition that a state in which the communication is not restricted continues for a predetermined time or more and a condition that the communication is continuously performed a predetermined number of times or more without the restriction on the communication is satisfied.

According to (4), by not switching the methods of the automatic movement control even when the communication is temporarily not restricted, it is possible to prevent a situation in which the tasks of the user are frequently switched when a variation in the communication environment is large, which can reduce the load on the user.

(5) The movement control system according to any one of (1) to (4), in which a state in which the communication is restricted is a state in which a delay amount of the communication exceeds a predetermined value.

According to (5), by switching the subject of the automatic movement control on the moving object according to the delay amount of the communication, the continuity of the automatic movement control on the moving object can be improved.

(6) The movement control system according to any one of (1) to (5), in which the first automatic movement control has more amount of processing than the second automatic movement control.

According to (6), the first control device is a higher-level device having more calculation resources and more available information than those of the second control device, and can execute the first automatic movement control in which the amount of processing is larger than that of the second automatic movement control by the second control device. When the communication between the first control device and the second control device is not restricted, the load on the user can be reduced by executing the first automatic movement control in which the amount of processing is large.

(7) The movement control system according to any one of (2) to (4), in which the second automatic movement control has more amount of processing than the third automatic movement control.

According to (7), the second control device is a higher-level device having more calculation resources and more available information than those of the moving object, and can execute the second automatic movement control in which the amount of processing is larger than that of the third automatic movement control by the moving object. When the communication between the first control device and the second control device is restricted and the communication between the second control device and the moving object is not restricted, the load on the user can be reduced by executing the second automatic movement control in which the amount of processing is large.

(8) A movement control method in a movement control system including a moving object, a first control device capable of communicating with the moving object, and a second control device configured to relay communication between the moving object and the first control device, the movement control method includes:

when communication between the first control device and the second control device is not restricted, performing, by the first control device, first automatic movement control on the moving object via the second control device; and when the communication between the first control device and the second control device is restricted, performing, by the second control device, second automatic movement control on the moving object, and the first automatic movement control has fewer tasks assigned to a user of the moving object than the second automatic movement control.

According to (8), similarly to the movement control system of the (1), the continuity of the automatic movement control from the outside on the moving object can be improved. In addition, the load on the user can be reduced.

(9) A non-transitory computer-readable storage medium storing a control program for a second control device configured to relay communication between a moving object and a first control device capable of communicating with the moving object in a movement control system including the moving object and the first control device, the control program causing a computer of the second control device to execute processing including:

relaying, when communication between the first control device and the second control device is not restricted, first automatic movement control on the moving object performed by the first control device; and performing, when the communication between the first control device and the second control device is restricted, second automatic movement control on the moving object, in which the first automatic movement control has fewer tasks assigned to a user of the moving object than the second automatic movement control.

According to (9), similarly to the movement control system of the (1), the continuity of the automatic movement control from the outside on the moving object can be improved. In addition, the load on the user can be reduced.

(10) A control device (base station 300) configured to relay communication between a moving object and a first control device capable of communicating with the moving object in a movement control system including the moving object and the first control device, the control device includes:

a communication unit (communication unit 310) capable of communicating with the moving object and the first control device; and a control unit (AD ECU 320) configured to relay, when communication between the first control device and the communication unit is not restricted, first automatic movement control on the moving object performed by the first control device, and perform, when the communication between the first control device and the communication unit is restricted, second automatic movement control on the moving object, in which the first automatic movement control has fewer tasks assigned to a user of the moving object than the second automatic movement control.

According to (10), similarly to the movement control system of the (1), the continuity of the automatic movement control from the outside on the moving object can be improved. In addition, the load on the user can be reduced.

What is claimed is:

1. A movement control system comprising:
    a moving object;
    a first control device capable of communicating with the moving object; and
    a second control device as a base station configured to relay the communication between the moving object and the first control device, wherein
    when communication between the first control device and the second control device is not restricted, the first control device generates a first action plan of the moving object and performs first automatic movement control on the moving object in accordance with the first action plan via the second control device,
    when the communication between the first control device and the second control device is restricted, the second control device generates a second action plan of the moving object and performs second automatic movement control on the moving object in accordance with the second action plan, and
    the first automatic movement control has fewer tasks assigned to a user of the moving object than the second automatic movement control.

2. The movement control system according to claim 1, wherein
    when communication between the second control device and the moving object is restricted, the moving object autonomously generates a third action plan thereof and performs third automatic movement control in accordance with the third action plan, and
    the second automatic movement control has fewer tasks assigned to the user than the third automatic movement control.

3. The movement control system according to claim 2, wherein
    the second control device performs the second automatic movement control when restriction on the communication between the second control device and the moving object is eliminated while the moving object is executing the third automatic movement control, and then, the first control device performs the first automatic movement control when the communication between the first control device and the second control device is not restricted.

4. The movement control system according to claim 3, wherein
    elimination of the restriction on the communication is established when at least one of a condition that a state in which the communication is not restricted continues for a predetermined time or more and a condition that the communication is continuously performed a predetermined number of times or more without the restriction on the communication is satisfied.

5. The movement control system according to claim 2, wherein
    the second automatic movement control has more amount of processing than the third automatic movement control.

6. The movement control system according to claim 1, wherein a state in which the communication is restricted is a state in which a delay amount of the communication exceeds a predetermined value.

7. The movement control system according to claim 1, wherein
the first automatic movement control has more amount of processing than the second automatic movement control.

8. A movement control method in a movement control system including a moving object, a first control device capable of communicating with the moving object, and a second control device as a base station configured to relay communication between the moving object and the first control device, the movement control method comprising:
when communication between the first control device and the second control device is not restricted, generating, by the first control device, a first action plan of the moving object and performing, by the first control device, first automatic movement control on the moving object in accordance with the first action plan via the second control device; and
when the communication between the first control device and the second control device is restricted, generating, by the second control device, a second action plan of the moving object and performing, by the second control device, second automatic movement control on the moving object in accordance with the second action plan, wherein
the first automatic movement control has fewer tasks assigned to a user of the moving object than the second automatic movement control.

9. A non-transitory computer-readable storage medium storing a control program for a second control device as a base station configured to relay communication between a moving object and a first control device capable of communicating with the moving object in a movement control system including the moving object and the first control device, the control program causing a computer of the second control device to execute processing comprising:
when communication between the first control device and the second control device is not restricted, relaying first automatic movement control on the moving object performed by the first control device; and
when the communication between the first control device and the second control device is restricted, generating an action plan of the moving object and performing second automatic movement control on the moving object in accordance with the action plan, wherein
the first automatic movement control has fewer tasks assigned to a user of the moving object than the second automatic movement control.

10. A control device as a base station configured to relay communication between a moving object and a first control device capable of communicating with the moving object in a movement control system including the moving object and the first control device, the control device comprising:
a communication unit capable of communicating with the moving object and the first control device; and
a control unit configured to
relay first automatic movement control on the moving object performed by the first control device, when communication between the first control device and the communication unit is not restricted, and
generate an action plan of the moving object and perform second automatic movement control on the moving object in accordance with the action plan, when the communication between the first control device and the communication unit is restricted, wherein
the first automatic movement control has fewer tasks assigned to a user of the moving object than the second automatic movement control.

* * * * *